(12) United States Patent
Rofrano

(10) Patent No.: US 6,324,536 B1
(45) Date of Patent: *Nov. 27, 2001

(54) METHOD AND SYSTEM FOR PROVIDING INTERACTIVE ELECTRONIC CATALOG FOR PRODUCT AND CONSTRAINT INFORMATION OF EQUALITY AND INEQUALITY SEARCH

(75) Inventor: John J. Rofrano, Mahopac, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/977,203

(22) Filed: Nov. 24, 1997

Related U.S. Application Data

(60) Provisional application No. 60/053,345, filed on Jul. 22, 1997.

(51) Int. Cl.[7] .................................................. G06F 17/30
(52) U.S. Cl. ........................... 707/5; 707/3; 707/102; 707/104; 705/26; 705/27; 345/968
(58) Field of Search .................................. 707/1, 2, 3, 4, 707/5, 6, 7, 8, 9, 10, 100–104, 501, 513, 516, 908, 526, 500; 705/10, 22, 27, 28, 26; 345/333–335, 968

(56) References Cited

U.S. PATENT DOCUMENTS

| | | | |
|---|---|---|---|
| 5,410,692 | * | 4/1995 | Torres ........................................ 707/3 |
| 5,710,887 | * | 1/1998 | Chelliah et al. ......................... 705/26 |
| 5,715,444 | * | 2/1998 | Danish et al. ............................ 707/4 |
| 5,734,888 | * | 3/1998 | Li et al. .................................... 707/4 |
| 5,740,425 | * | 4/1998 | Povilus .................................. 707/100 |
| 5,751,286 | * | 5/1998 | Barber et al. .......................... 345/348 |
| 5,761,655 | * | 6/1998 | Hoffman .................................. 707/4 |
| 5,819,092 | * | 10/1998 | Ferguson et al. ..................... 395/701 |
| 5,832,496 | * | 11/1998 | Anand et al. ......................... 707/102 |
| 6,076,091 | * | 6/2000 | Fohn et al. ............................ 707/102 |

* cited by examiner

*Primary Examiner*—Jack Choules
*Assistant Examiner*—Srirama Channavajjala
(74) *Attorney, Agent, or Firm*—Wayne L. Ellenbogen; Anne Vachon Dougherty

(57) ABSTRACT

A system for collecting, categorizing and searching metadata about products which may be the subject of user-input inequality searches. Unique methods are provided for: generating image information at the user interface; inputting of the inequality search; conducting an inequality search based on the metadata in response to input at the user interface; and; displaying the search results appropriately.

21 Claims, 5 Drawing Sheets

METHOD AND SYSTEM FOR PROVIDING INTERACTIVE ELECTRONIC CATALOG FOR PRODUCT AND CONSTRAINT INFORMATION OF EQUALITY AND INEQUALITY SEARCH

CROSS-REFERENCE TO RELATED APPLICATION

The present application claims priority to co-pending U.S. Provisional Application Serial No. 60/053,345 which was filed on Jul. 22, 1997.

FIELD OF THE INVENTION

This invention relates to the field of electronic information searching. More specifically, it relates to internet-based electronic catalog query and response interactions for product inquiries and sales.

BACKGROUND OF THE INVENTION

Search tools for advancing through information provided in a database have been available for years. Generally, in such applications, a user's responses direct progress through the layers of available information. The interaction follows one of a plurality of pre-set paths along a decision tree, with the user input typically being limited as responses to pre-defined choices. As an example, so-called "expert systems," such as searchable on-line medical databases, are navigated via responses to system prompts regarding symptoms which are tied to various diagnoses in a relational database. Interactive on-line catalog sales applications utilize user responses to questions, which may directly or indirectly relate to products in the catalog. The user may indicate his or her interest in defined categories of product information and then be provided with appropriate screens displaying available product from the database.

Shortcomings of available prior art search and query tools include the fact that all users must interact with the system using a limited set of pre-established interactions. Necessarily the pre-established interactions are predisposed toward a particular type of customer and cannot effectively meet the needs of a larger audience of users that may have an interest in the information. In addition, all users must navigate through the pre-set paths and iterations to obtain information regarding features of the available products.

Different users will also have different interaction parameters with respect to the level of product detail that they require. For example, when shopping for a computer, a professional programmer will approach the interaction with more detailed specification requirements than will a user who is shopping for a home computer for "recreational" use. Finally, the details of the actual display of product information should ideally differ depending upon the user, the user's needs, and the user's knowledge in the area. An inventive electronic catalog system has been developed, and is the subject of co-pending U.S. patent application Ser. No. 08/987,214, filed Dec. 9, 1997, which was based on is now U.S. Pat. No. 6,076,091, provisional patent application Ser. No. 60/032,543, entitled "METHOD AND SYSTEM which is the subject of U.S. Pat. No. 6,076,091 which issued on Jun. 13, 2000, FOR PROVIDING A FLEXIBLE AND EXTENSIBLE ON-LINE ELECTRONIC CATALOG," which was filed on Dec. 10, 1996 and is assigned to the present assignee (hereinafter referred to as "assignee's system"). In that application, the inventors detailed an electronic catalog system which provides the user with the ability to interact at a user-defined level of detail, in the user's preferred language, and with user-directed queries, as opposed to the relatively static prior art interaction systems. Particularly significant to the assignee's system is the ability for meaningful interactions at the user's level of product awareness, so that the user does not have to step through a series of query interactions which are too fundamental, or too advanced, for the user's level of interest and/or knowledge.

Queries input to presently available electronic catalogs had, in the past, been limited to responding to system-generated "yes-no" questions, or to inputting specific product feature details; for example, inputting "memory=4" would obtain product information about systems which have exactly 4 MB of memory. Such queries could only provide limited information to the user, and would not allow for retrieval of all of the relevant information which may be desired by the user, and which would be available in the assignee's system. The "memory=4" query noted above will, using prior art search tools, retrieve all systems which are available for sale with exactly 4 Mb of memory. It may be, however, that the user wishes to obtain information about all available systems which have at least 4 Mb of memory. Inexact or inequality searching requires additional searching steps and additional characterization of product data which would not otherwise be maintained under the prior art electronic catalog methods and systems.

Prior art systems are not only unable to respond to inequality queries, but are also ill-equipped to respond to successive user-defined refinements of queries. For example, when the user is choosing the search parameters for searching in a web-based Common Gateway Interface (CGI), and the search parameters are input in random order, such that the user is not following a pre-set path along a system decision tree, the CGI will not retain information regarding the user's preceding refinements/parameters and is, therefore, unable to support the iterative query. In addition, at the graphical user interface (GUI) level, prior art systems based on hypertext mark-up language (HTML) do not readily allow for the graphical expression required to support the preferred user interaction involving inequalities.

It is therefore an objective of the present invention to provide an on-line catalog interaction methodology to support inequality searching for retrieval of product information.

It is another objective of the invention to provide an extensible system to characterize product data for retrieval based upon an inequality search.

Still another objective of the invention is to provide data collection, categorization and searching methodologies which support inequality searching for retrieval of product information.

Yet another objective of the invention is to provide for on-line product searching which involves multiple iterations for user refinement of the query.

SUMMARY OF THE INVENTION

These and other objectives are realized by the present invention which provides a system for collecting and categorizing metadata about products which may be the subject of user-input inequality searches, which metadata is used in a unique method for retrieving and displaying the product data. Unique methods are provided for: generating image information at the user interface; inputting of the inequality search; conducting an inequality search based on the metadata in response to input at the user interface; and, displaying the search results appropriately.

BRIEF DESCRIPTION OF THE DRAWINGS

The invention will now be further detailed with specific reference to the appended Figures wherein:

FIG. 1 provides a schematic illustration of the graphical user interface for inequality searching using textually-marked selection buttons created using HTML.

FIG. 2 provides a schematic illustration of the graphical user interface for inequality searching in accordance with the present invention.

DESCRIPTION OF THE PREFERRED EMBODIMENT

User interaction techniques with systems using the hypertext mark-up language (HTML) on the world wide web (WWW) are severely limited when compared to graphical interfaces found in modern day windowing systems that are found on personal computers. These web-based systems must provide interactions which are easy enough to use in order for users to build queries that involve inequalities. Expressing such inequalities usually takes a sophisticated user interface requiring multiple screen representations (i.e., "buttons"), multiple interactions (i.e., multiple successive steps to refine the query), and a trained user who understands how to put several query concepts together to express the search that they require, including all of the search constraints.

Under the present invention, product information is gathered and dynamically maintained to facilitate inequality searching. As a first step to gathering and categorizing the product data, one must determine which product features are candidates for "greater than or equal to" and "less than or equal to" searches based upon the data type. All numeric data types (i.e., float, double, numeric and int.) are suitable values for inequality searching. Character data, however, cannot be quantified, and is therefore not suited for quantification comparisons, other than "=" or "≠". For example, if the data represents CD-ROM speed with the values "6X", "8X", "10X", and one performed a search for "CD-ROM>6X", the search would retrieve only products with "6X" and "8X" drives, because the first character of "10X" is "1", which is less than the first character in "6X." It is for this reason that inequality searching cannot be conducted on character data. It is also important to note that the query must include "or equal to" so that the selected value be included in the search, or else the search will come back empty if the largest or smallest value in the list is selected with ">" or "<", respectively.

Data formatting and presentation is another problem which must be solved. To determine how to display the data, one must first understand, for example, how the data is to be used,; whether it is displayable; whether it needs special treatment for localized use (such as formatting of conversion of currency values in displaying product pricing); and, whether the data is the name of an image file and should be displayed as an image and not as the image file name. Also, one must determine what means should be used to display the values, such as a simple text hyperlink, a choice box, multiple selection boxes, radio buttons, check boxes, etc. Some displays will allow single selections while others allow multiple selections, either of which will directly affect how the query is to be built.

Figure 6:
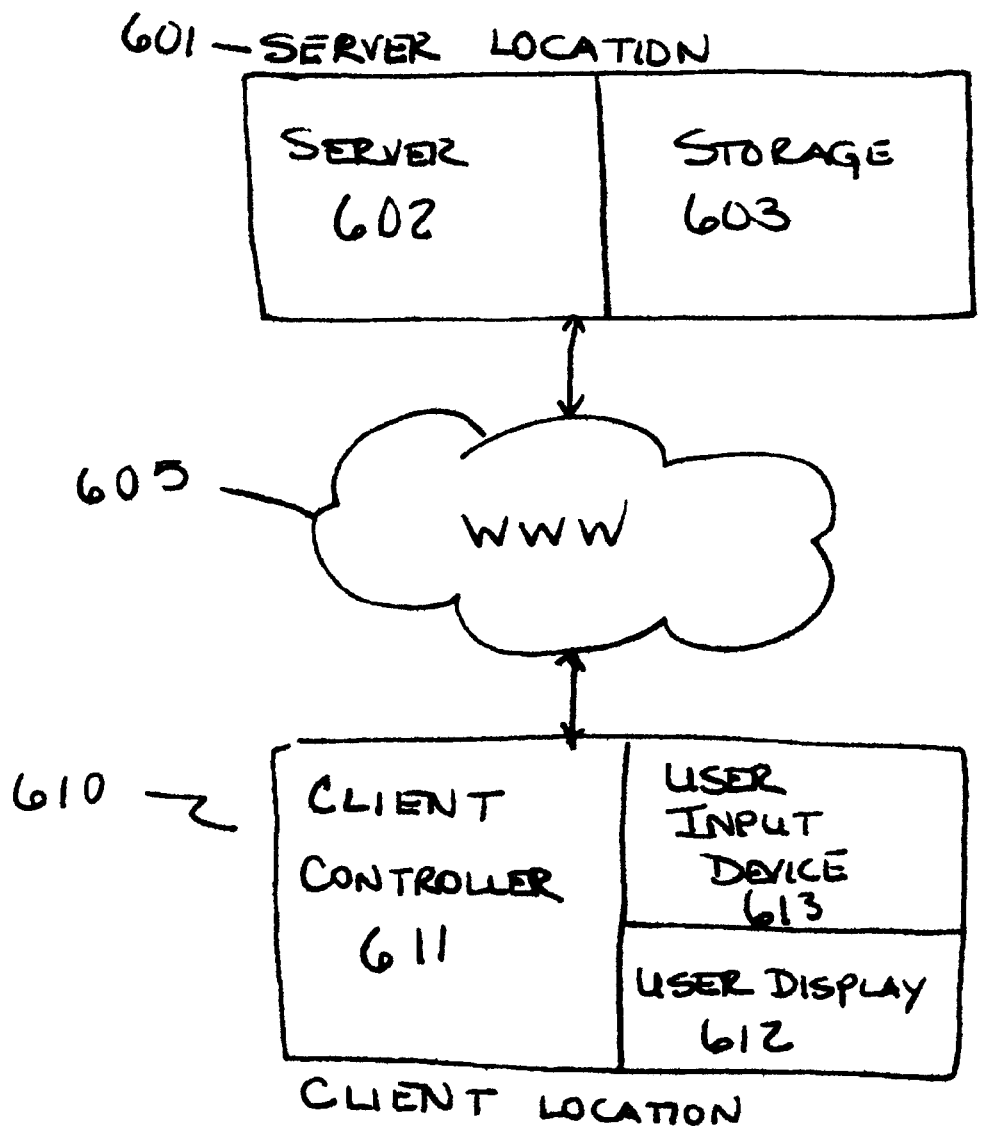
FIG. 6 provides a schematic of a user/client: server system for implementation of the present invention.
Figure 3:
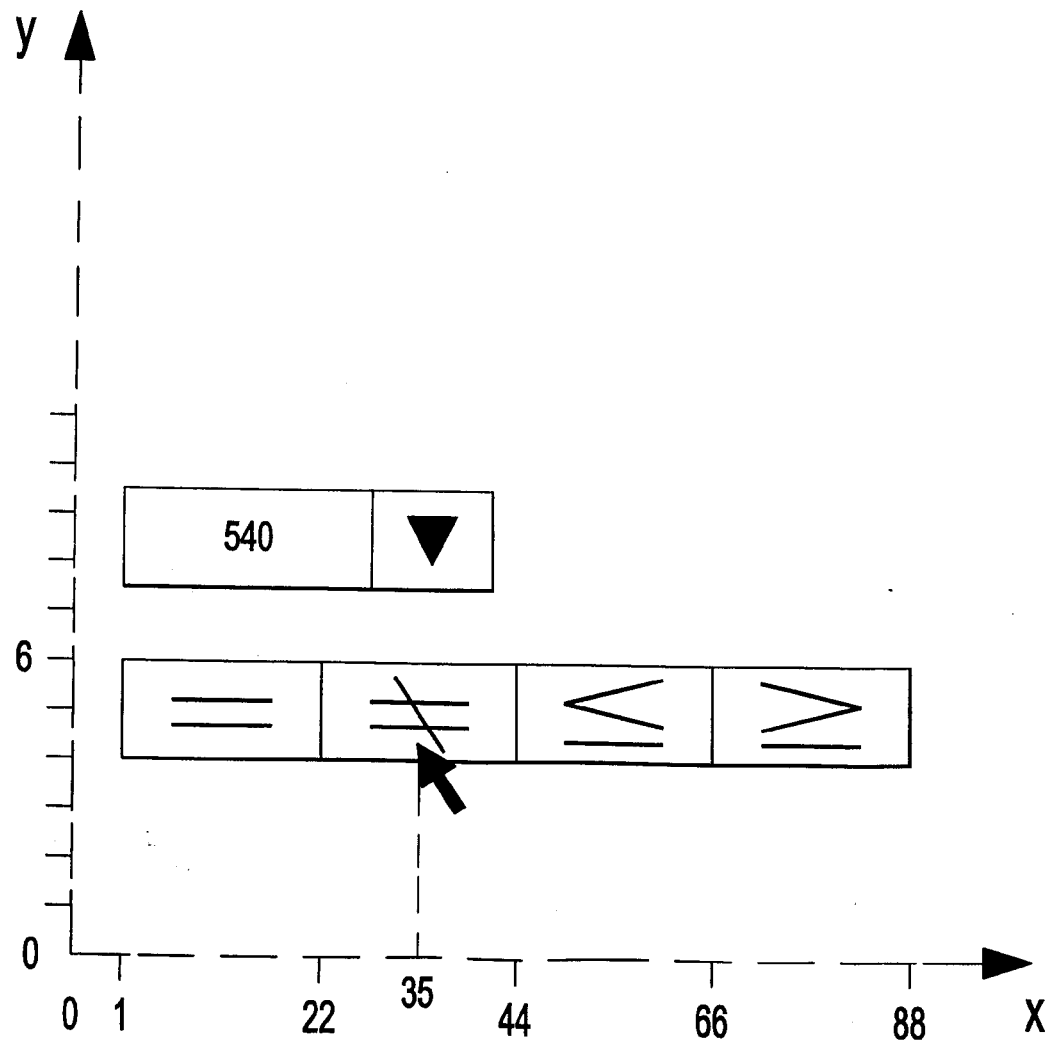
Figure 4:
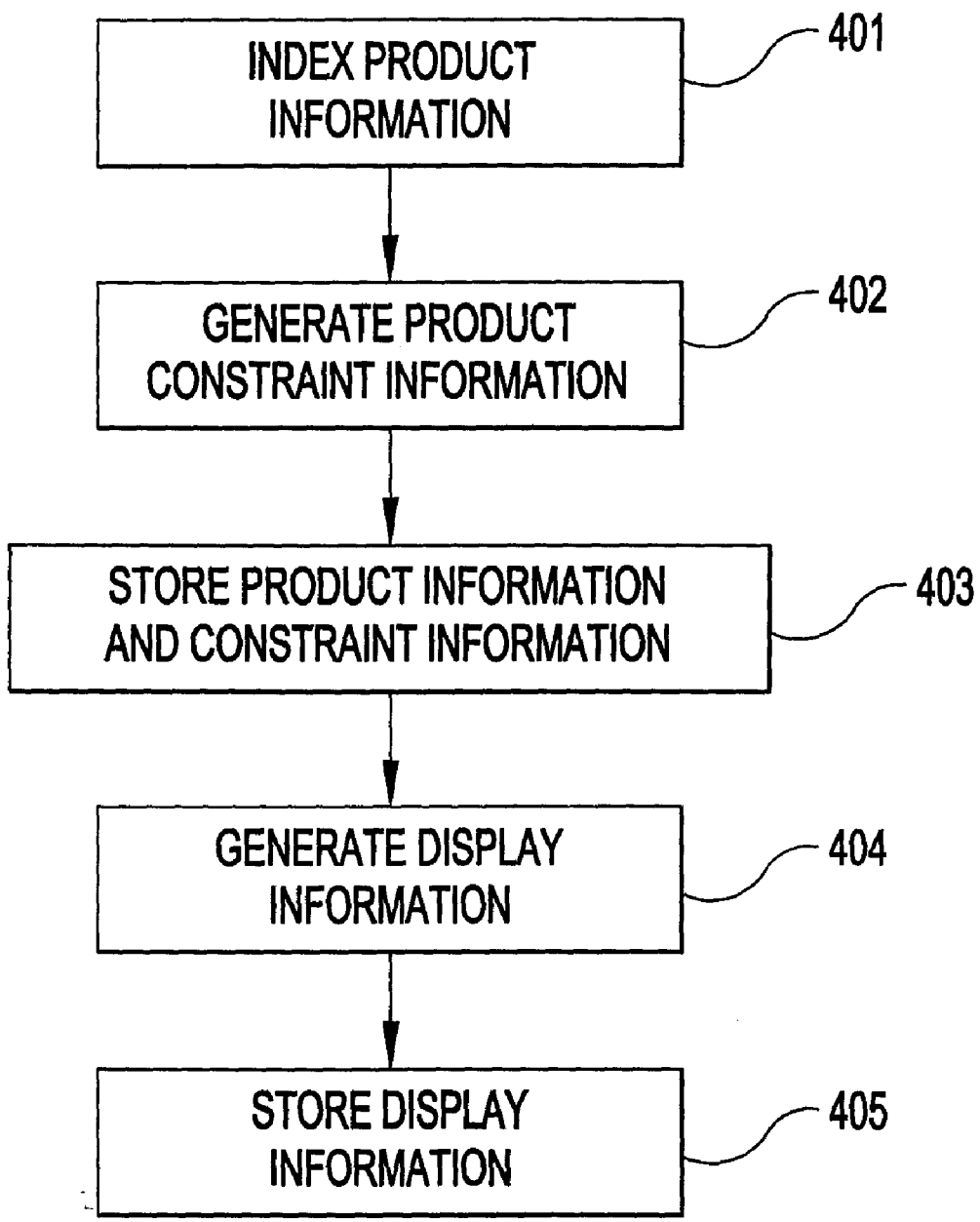
Figure 5:
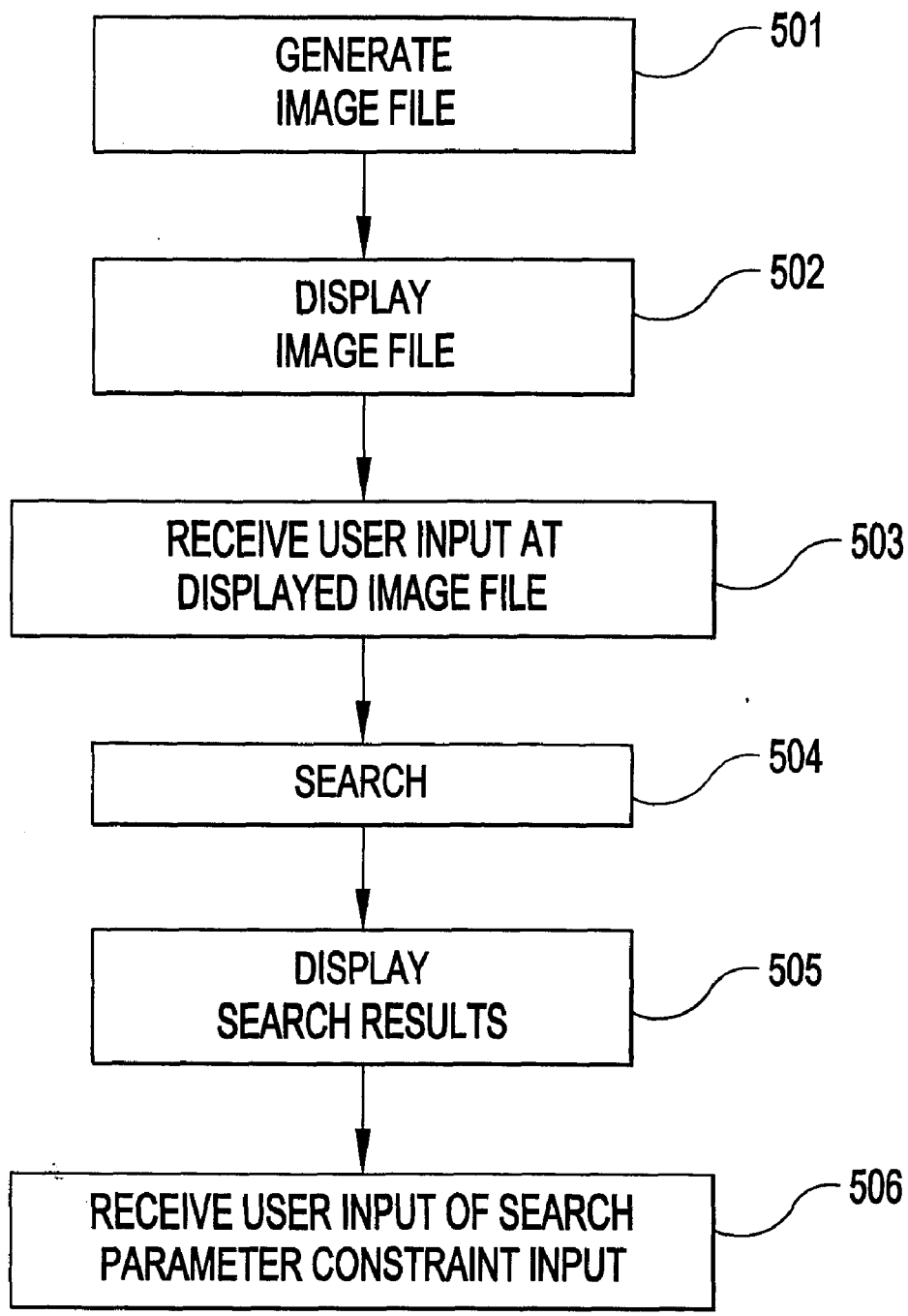
Figure 6:
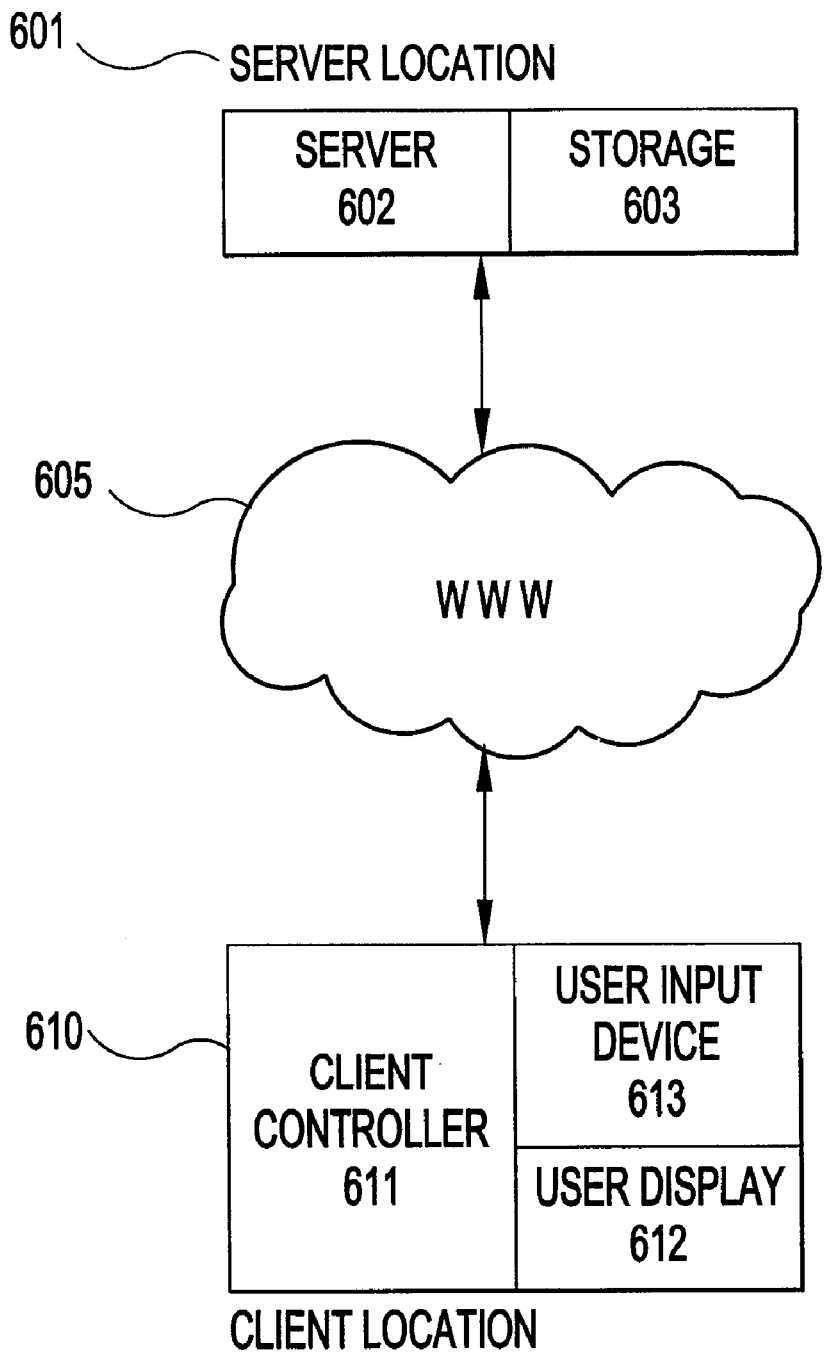

FIG. 6 provides a schematic illustration of a client:server system for implementation of the present invention. Server location 601 includes at least one server 602 for performing the build-time and run-time processing steps discussed below and for storing the results in the at least one storage location 603. The server is connected across the network, WWW 605, to a client location 610 which includes at least a client computer 611, user display 612, and user input device 613.

Search Data Requirements

Determining the data type, data usage, and display means is done by collection of "metadata" in a "build-time" step. "Metadata" is simply, "data about data." The "build-time" is the name given to the preparation steps conducted prior to allowing the users of the system to perform their queries (as opposed to "run-time" when the user is using the system). This metadata is collected with a builder tool at the individual feature/field level and has two levels of granularity. The first level ("level 1") is metadata about the feature itself, which is immutable information about the data. Its name, type, usage, etc. will not change regardless of how the data is displayed. Level 1 data is composed of the data elements shown in Table I:

TABLE I

| COLUMN NAME | TYPE | PURPOSE |
| --- | --- | --- |
| MerchantID | INTEGER | ID used in multiple merchant environments |
| CategoryID | INTEGER | ID used to identify a category of products |
| FeatureID | INTEGER | ID for single product feature |
| Name | CHARACTER | The column name of product in the table |
| Usage | INTEGER | HOW feature used (e.g., data, image, etc.) |
| Size | INTEGER | Size of the data if character-based |
| Type | INTEGER | Type of data (e.g., float, double, etc.) |
| Unit | CHARACTER | String representing unit of measure |
| KeySequence | INTEGER | Indicates this is part of a key field |
| Nullable | INTEGER | Flag to determine if null values allowed |
| Description | CHARACTER | A textual description to use to label the data when displaying to the user |
| Elaboration | CHARACTER | Long detailed description of feature |
| Location | INTEGER | Indicator of where the data originally came from (used in rebuilding data) |
| Included | INTEGER | Flag to determine if the feature should be included at run-time |
| Scale | INTEGER | If data type is numeric, the number of digits left of the decimal |
| Precision | INTEGER | If data type is numeric, the number of digits right of the decimal |

The second level of metadata (Level 2) is concerned with the particular manner of display chosen for the feature. This data might change for a different instance of the data, so that the relationship between the first and second levels of data is one too many. The second level of metadata is composed of display attributes about the data, for example: what manner in which the data should be displayed; how multiple values should be sorted; and whether a unit of measure should be displayed next to the values, how juxtaposed, etc. Table II provides the Level 2 metadata:

TABLE II

| COLUMN | TYPE | PURPOSE |
| --- | --- | --- |
| MerchantID | INTEGER | ID used in multiple merchant environments |
| CategoryID | INTEGER | ID used to identify category of products |
| FeatureID | INTEGER | ID used to identify a single product feature in the Level 1 metadata |
| MetaphorID | INTEGER | ID used to identify the metaphor for which the metadata was collected |
| Displayable | INTEGER | Flag indicating if the feature should be displayed |
| Sort | INTEGER | Flag to indicate ascending or descending sort of data values |
| WidgetType | INTEGER | Type of display to be used for values |
| OrderSeq | INTEGER | Order Sequence-if the feature is part of a key; its position in the key |
| UOMDisplay | INTEGER | Flag to indicate if the unit of measure string should come before or after the data, or not be displayed at all |
| ProductLink | INTEGER | Flag to indicate that selecting this feature will link to its product |

Given the availability of the foregoing Level 1 and Level 2 metadata, the system can dynamically determine how to deal with the data at run-time. Representative pseudo-code for using the available metadata at run-time follows:

```
GET CATEGORY FOR SEARCH
GET PREVIOUS CONSTRAINTS
GET LIST OF FEATURES OF PRODUCTS IN CATEGORY
FOR EACH FEATURE
    GET METADATA ABOUT THE FEATURE
    IF IT SHOULD BE DISPLAYED
        GET UNIQUE VALUES, GIVEN CONSTRAINTS, SORTED
            BY METADATA SORT
        GET USAGE
        IF AN IMAGE
            GET THE ACTUAL INAGE
        END IF
        IF IS CURRENCY
            FORMAT CURRENCY FOR LOCALE SETTING
        END IF
        GET THE WIDGET TYPE
        DISPLAY THE VALUES
        IF THE DATA IS CHARACTER
            SHOW QUERYBAR FOR =, ≠
        ELSE
            SHOW QUERYBAR FOR =, ≠, >, <
        END IF
    ENDIF
END FOR EACH FEATURE.
```

Figure 4:
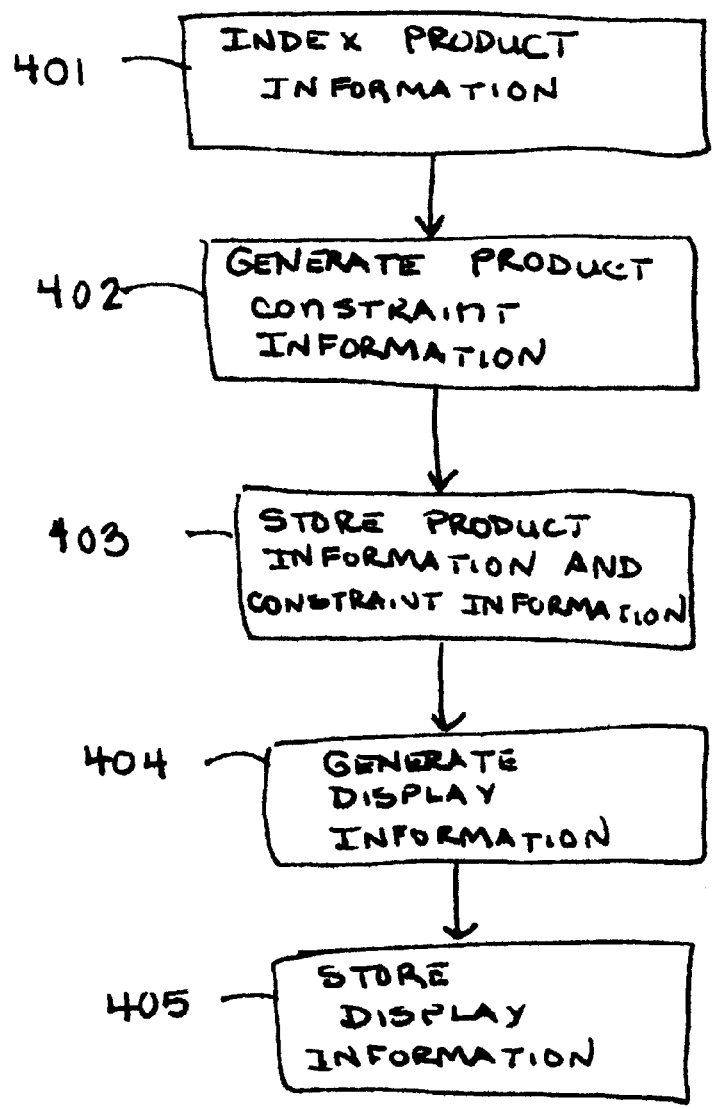
FIG. 4 provides a representative process flow for the inventive build-time processing steps.

In FIG. 4, the "build-time" processing steps are representatively illustrated. At step 401, the product information is indexed, followed by generating product constraint information at step 402. The product constraint information comprises the "immutable" first level metadata. Once the information has been generated, the product information and product constraint information are stored at step 403 for use upon initialization of a user query (discussed below as "run-time" processing). Additional display information may be generated at step 404 and stored, at step 405.

The system is further driven by a set of templates at run-time. These templates determine the overall layout of the data. While the data is assumed to be displayed in a table, the template can define how that table should look, (e.g., its orientation, number of rows and columns, background colors, etc.). Any information which is unique to a specific feature is specified in the metadata and any information that controls the overall layout of features is specified in the template. By using these methods, the final determination of what features are shown and how they are sorted, etc., is left to the product expert who enters the data; while the final design and presentation to the customer is left to someone who understands catalog and product layout, such as a graphics artist.

The templates are HTML files having special tags that the system recognizes during run-time and processes appropriately. Anything that is not a recognizable tag is passed through the system to be processed by the web server. The custom tags are placed in "comments" so as not to confuse a web browser, which would be unable to "understand" them. The format of the tags is as follows:

<!--IC_TAG=tagname option1=value1 option2=value2 etc . . . -->

At run-time, the system searches for lines in the template which start with "<!--ICTAG=" and then parses the next word to determine which type of tag is present. The system then passes the remainder of the string over to a class which knows how to process that particular tag. The tag class then renders the tag to the client. All of the known tags are kept in the registry which aids the run-time program in determining what tags are valid and what classes should be used to process the tags. In this way, tags can be added in the future without any modifications of the system, thereby allowing dynamic updating of the display formats without requiring that the catalog be taken "off line" during implementation of updates. Because the system is written in JAVA, new classes can be added while the system is running, simply by refreshing the registry.

The pseudo-code for the master run-time loop, including template recognition and implementation, is shown below:

```
GET CATEGORY
GET CONSTRAINTS
GET TEMPLATE
READ A LINE OF TEMPLATE FILE
WHILE NOT END OF TEMPLATE FILE
    IF LINE CONTAINS OUR TAG SIGNATURE
        CHECK TAG REGISTRY FOR EXISTENCE OF TAG
        IF WE RECOGNIZE TAG
            INSTANTIATE CLASS REGISTERED TO TAG
            CALL CLASS PASSING IN CATEGORY,
            CONSTRAINTS
                AND REMAINDER OF TAG TEXT
        ENDIF
    ELSE
        PASS LINE OF TEMPLATE FILE TO WEB SERVER
            TO PROCESS
    ENDIF
    READ A LINE OF TEMPLATE FILE
END WHILE.
```

The call to the class that handles the tag, shown in the master run-time loop pseudo-code above, invokes similar pseudo-code to that shown previously. Therefore, the main run-time logic simply iterates over the template looking for tags to process, and the actual processing, which is unique to each tag, is handled by a tag's registered class.

The valid tags for a representative implementation of the system are seen in Table III. Each tag is registered in a row of a database table which contains the name of the tag and the name of the class which must be used to process the tag.

TABLE III

| NAME | OPTIONS |
| --- | --- |
| IC_TAG=CAT_NAME | n/a |
| IC_TAG=PROD_COUNT | n/a |
| IC_TAG=SA_QUESTION | n/a |
| IC_TAG=SA_ANSWERS | n/a |

TABLE III-continued

| NAME | OPTIONS |
|---|---|
| IC_TAG=QA_HISTORY | order-LQF FQL |
| IC_TAG=PC_LINK | image=image name |
| IC_TAG=PE_LINK | image=image name |
| IC_TAG=SA_LINK | image=image name |
| IC_TAG=PC_TABLE | orientation=HORIZONTAL VERTICAL |
| | values=COMMON UNIQUE |
| | headbgcolor=#color value |
| IC_TAG=PE_TABLE | orientation=HORIZONTAL VERTICAL |
| | values=COMMON UNIQUE |
| | headbgcolor=#color value. |

User Interface Image

Once the system is capable of supporting inequality searching, the user interface must provide an input mechanism beyond that which has been previously available. However, the need for multiple buttons to express the various values of equality and inequality may clutter the screen in an environment where screen real estate is very expensive. For example, if a customer is presented with a selection of ten (10) product features, forty (40) screen representations or buttons would be needed to express all of the statements of the query (i.e., one each for "equal to feature x", "unequal to feature x", "greater than or equal to feature x" and "less than or equal to feature x" for each of features one through 10). The forty buttons would not only take up a great deal of screen real estate, but would also overwhelm the user with choices.

Figures 1, 2:
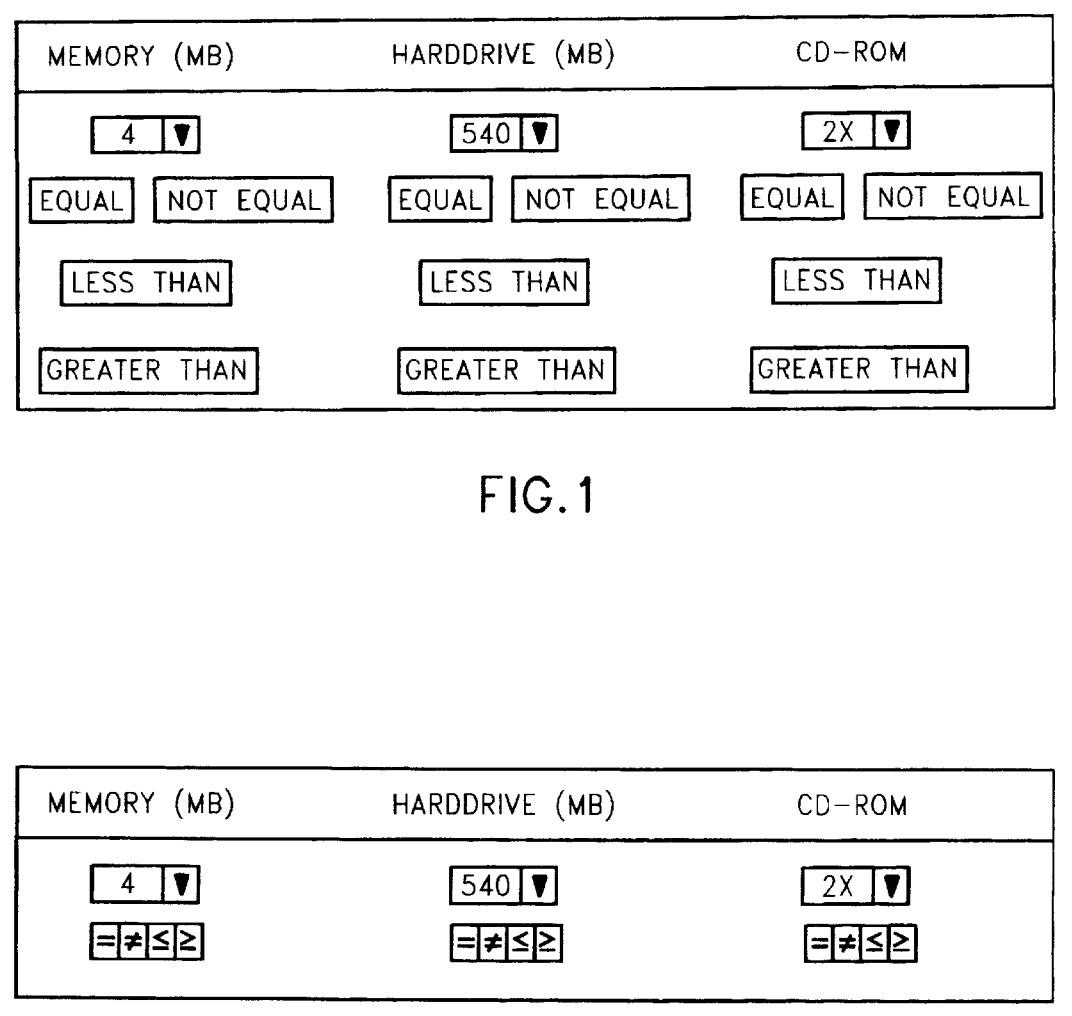

A first alternative is to provide four screen "buttons" to represent the four query statements for each feature, as schematically illustrated in FIG. 1. The HTML code for the illustrated hard drive representation would be as follows:

```
<TABLE CELLPADDING=5 CELLSPACING=2 BORDER=0
                            WIDTH=580 BGCOLOR=#ccccff >
<TR>
. . . other cells here . . .
<FORM METHOD=GET ACTION="/cgi-bin/mycgi">
    <SELECT NAME=HARDDRIVE>
    <OPTION VALUE="540" >540
    <OPTION VALUE="720" >720
    <OPTION VALUE="810" >810
    <OPTION VALUE="1200" >1200
    <SELECT><BR>
    <INPUT TYPE=submit NAME=equals VALUE="Equal">
    <INPUT TYPE=submit NAME=notequals VALUE="Not equal">
    <INPUT TYPE=submit NAME=lessthan VALUE="Less than">
    <INPUT TYPE=submit NAME=greaterthan VALUE="Greater
    than">
</FORM>
</TR>
</TABLE>.
```

As is illustrated, the browser has "wrapped" the buttons for each feature, due to the fact that the buttons would have been too wide to display next to each other. The text button display is clearly not visually appealing for the user. Moreover, if one were to imagine all query statements for all product features, the display would overwhelm the user and the buttons dominate the look of the page. Furthermore, different web browsers may display the text buttons in different configurations, depending upon the browser's specifications and protocols. Therefore, a consistent look across different browsers accessing the underlying catalog could not be guaranteed.

In addition, when a selection is input by the user to one of the text buttons of FIG. 1, the web server would return a query string and utilize logic to test for the existence of each variable. For the "not equal" example, the query string developed by the common gateway interface (CGI) would be:

QUERY_STRING=HARDDRIVE=540¬equals= Not+equal.

As can be seen, there is no single variable to check, such that each button generates a new variable name. The query would require logic to test for the existence of each variable while anticipating that three of the four would not be generated. Once the program determined which variable was generated, it would then use logic to determine what to do next.

Alternatively, one could define all four buttons to have the same name as in the tags below:

<INPUT TYPE=submit NAME=operand VALUE= "Equal">

<INPUT TYPE=submit NAME=operand VALUE="Not equal">

<INPUT TYPE=submit NAME=operand VALUE="Less than">

<INPUT TYPE=submit NAME=operand VALUE= "Greater than">.

Using the latter programming, the CGI would return a string representing the button word, and a string compare would be conducted to compare the returned string to the available choices. String comparisons, however, are expensive to execute, making use of such comparisons a less than optimal solution. This user input interpretation process requires several steps; and, therefore extra time. While a useful option for implementing the inequality search, an alternative embodiment has been developed to provide faster, and more visually appealing query statement representations.

FIG. 2 illustrates the preferred embodiment of the graphical user interface for the inventive inequality searching. A selection bar, 20, 22 and 24, is provided for each of the product feature values for users of the computer system to easily indicate whether they are interested in retrieval of values equal to, not equal to, greater than or equal to, or less than or equal to, the illustrated value. The selection bar takes up minimal screen space and does not require sophisticated user input in order to implement the desired query. The product feature values, shown as memory in megabytes at 21, hard drive in megabytes at 23, and modem speed at 25, are each accompanied by a selection bar bearing mathematical symbols that express the query. Each selection bar is a single image which takes up minimal screen real estate. Since the selection bar is an image, the web browser will not separate the elements of the image and "wrap" them, as may occur with the text buttons shown in the FIG. 1 embodiment.

It is to be noted that the selection bar illustrated for each of the first two features, memory and hard drive, provides for selection of four queries based upon the displayed value. Therefore, the user can retrieve product information about all available computers having, for example, more than 4 Mb of memory but less than 540 Mb on the hard drive; or exactly 4 Mb of memory with a hard drive having more than 540 Mb; etc. Since the search conducted in response to selection of one of the four queries for either the memory or hard drive feature value is a numerical comparison, inequality searching is possible. For the illustrated value for the CD ROM, however, which is 2X (meaning two times the normal speed of 150 rpms), greater than and less than comparisons cannot be conducted on the character string "2X".

Therefore, the query choices provided for the CD ROM feature includes only equal to or unequal to the value 2X. As will be apparent to one having skill in the art, it may be possible to express the feature value differently in order to allow for inequality searching for that feature. For example, one could express the CD ROM feature in rpms (e.g., 300) and then conduct any of the four queries on the numerical representation, which does not then involve searching on character strings. Characterization of the product features in the electronic catalog is, however, ideally expressed in the terms of the art which have already been developed through standard marketing channels. Therefore, each type of representation and search can be supported by the present invention, as is appropriate to the product, the market, and the user needs.

Figure 3:
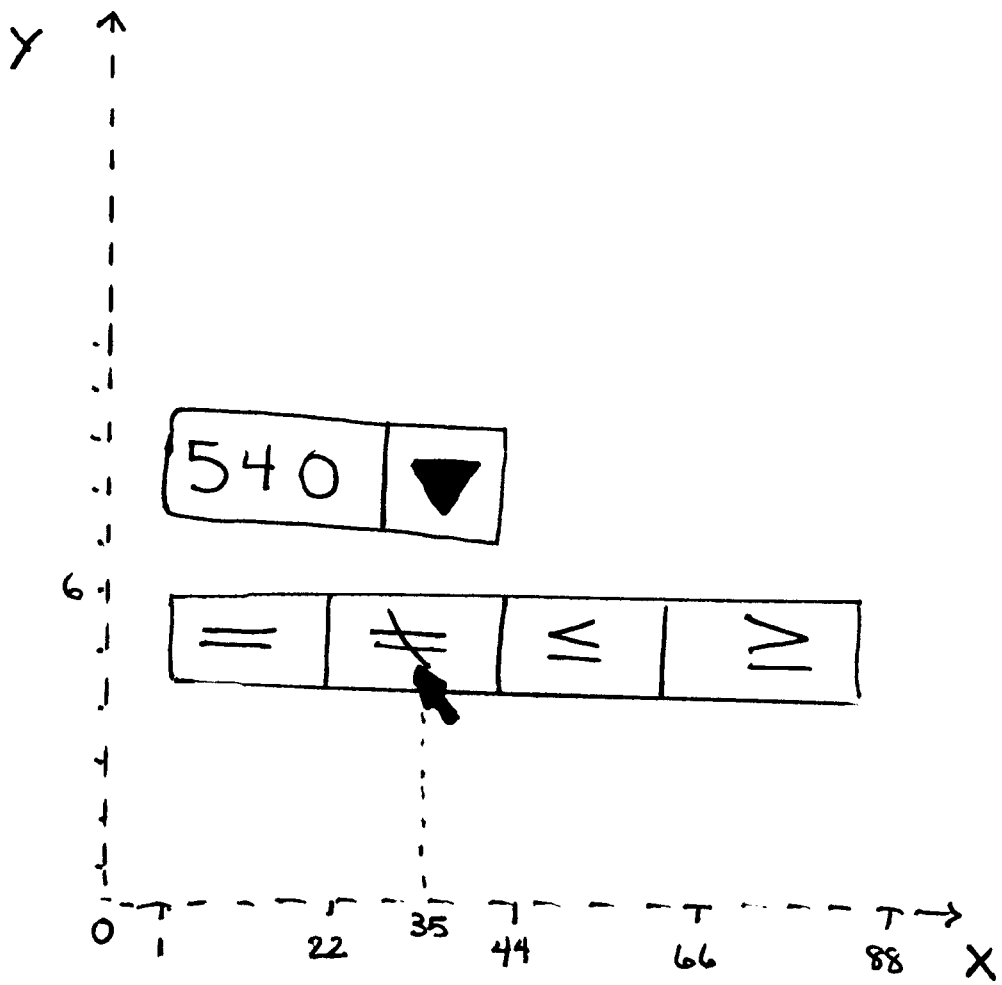
FIG. 3 provides a schematic illustration of the X-axis values of the image file representations of the equality:inequality values to be used in interpreting user input.

By providing a single image of the selection bar, one avoids the possibility of the web browser altering the display, as noted above. In addition, the input interpretation is facilitated by providing the queries as illustrated in FIG. 2. The CGI program that interprets the user input would use the X,Y coordinates returned from the call in the environment variable QUERY_STRING to determine where the user pressed on the button image. In actuality, for the illustrated selection bar/button as shown in FIG. 3, only the X coordinate is required for interpretation of the user's input. If the user pressed, or clicked on, the "not equal to" section of the image, the following query string would be returned to the CGI program:

QUERY_STRING=HARDDRIVE=540&X=35&Y=6.

Because the symbols on the selection bar are of identical size (e.g., 22 pixels in width), a simple offset calculation along the X axis can be used to determine how far over the user pressed, and thus what symbol was selected. In the example above, 35 is between 22 and 44, which places the input on the second symbol. Such input interpretation is much faster than the variable or character string comparisons required by the FIG. 1 embodiment. For data that is character-based, such as the CD ROM feature values discussed above, the less than and greater than queries may not be appropriate. The inappropriate query representations can be removed from the selection bar without affecting the programming logic, since the X values will simply not be generated in that range for the particular product feature displayed. The pseudo-code below shows the logic:

if (X<22)
   // the user pressed equal
else if (X<44)
   // the user pressed not equal
else if (X<66)
   // the user pressed less than or equal to
else if (X<88)
   // the user pressed greater than or equal to
endif.

The first "if()" that gets satisfied indicates the symbol selected by the user.

The selection bar can be implemented for a WWW application by using an HTML form which contains an <INPUT>tag that creates an image button. The button would use the bar as its image. The HTML code for using the selection bar would be as follows:

```
<TABLE CELLPADDING=5 CELLSPACING=2 BORDER=0
WIDTH=580
   BGCOLOR=#CCCCFF>
<TR>
```

-continued

```
... other cells here ...
<FORM METHOD=GET ACTION="/cgi-bin/mycgi">
   <SELECT NAME=HARDDRIVE>
      <OPTION VALUE="540" >540
      <OPTION VALUE="720" >720
      <OPTION VALUE="810" >810
      <OPTION VALUE="1200" >1200
   <SELECT><BR>
   <INPUT TYPE=image SRC="/icons/equalbar.gif" border=0
      VALUE=SUBMIT >
</FORM>
</TR>
</TABLE>.
```

The resulting display is an image that contains mathematical characters that would not otherwise be represented on an HTML page. Furthermore, because it is an image, the web browser will not wrap it in the cell. Programs that use the illustrated selection bar of FIG. 2 evaluate where on the bar the user has pressed or clicked to determine what action to take. The bar itself is generated from the single line of HTML code with the tag:

<INPUT TYPE=image SRC="/icons/equalbar.gif" border=0 VALUE=SUBMIT>

While the illustrated selection bar image is symmetrical, it may be generated as an asymmetrical image as well; however, input interpretation is not as straightforward for the asymmetrical image instance.

Operation

Figure 5:
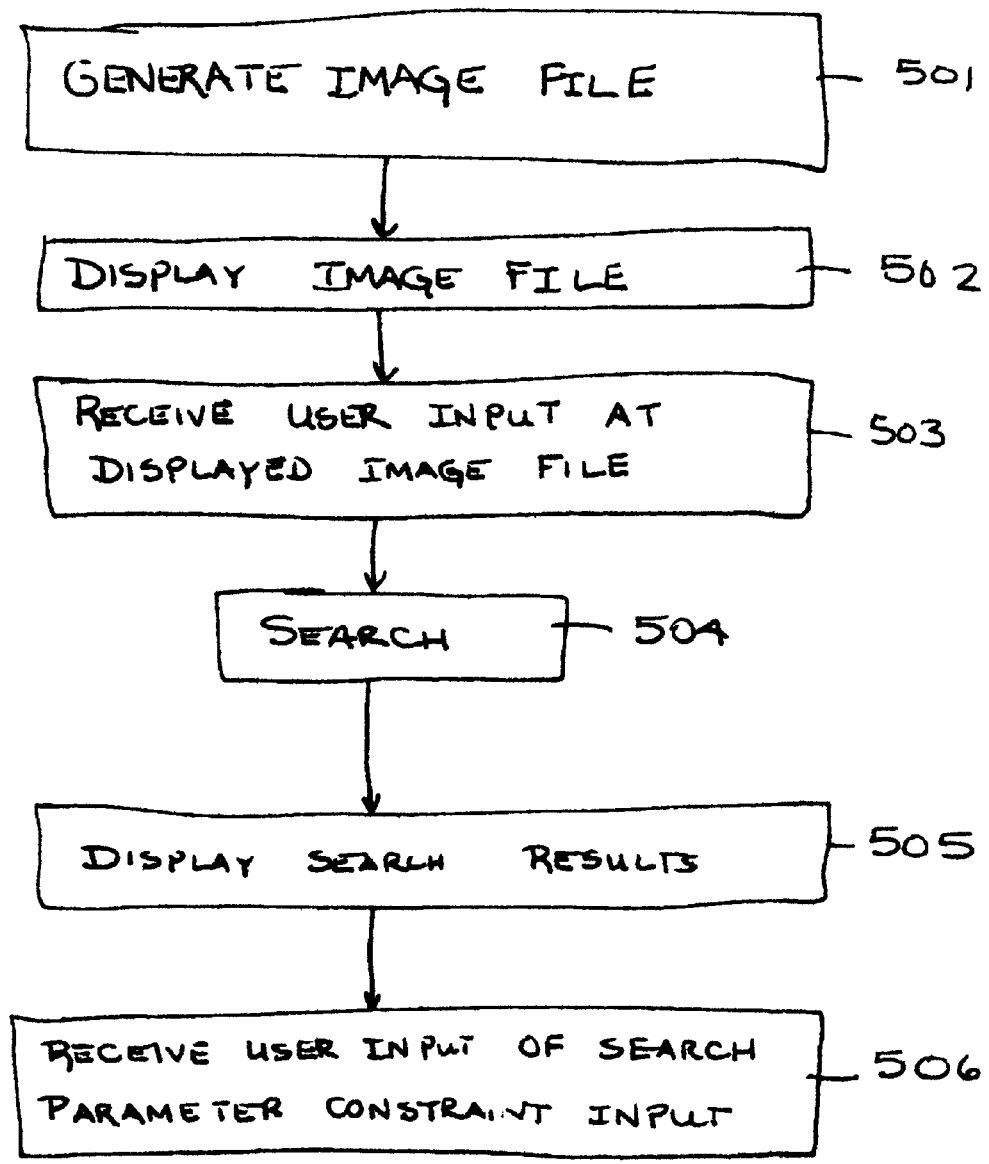
FIG. 5 provides a representative process flow for the inventive run-time processing steps.

In operation upon initialization a user will be presented with a query display based on the information generated and stored in accordance with the processing steps of FIG. 4. As shown in FIG. 5, the system will dynamically generate an image file, at step 501, and display the file, at 502, including the product features and graphical representations of the operators (i.e., the equality and inequality operators). The system receives user input, at step 503, as a user of the system selects a feature that they desire in a product (e.g., hard drive), a value or values desired for that feature (e.g., 1 GB), and an operation on that feature/value pair (e.g., "greater than or equal to"). They do this by selecting the value or values they want from a list that is generated for each feature. The system searches at 504 and displays the search results with further search parameters at 505. If further user input is receive, at 506, the system repeats the search and display steps until the user query is satisfied. The user input selection (again, by clicking on a portion of the image) is interpreted as a query similar to the following:

SELECT DISTINCT(HARDDRIVE) FROM FEATURETABLE WHERE <where_clause>.

The query shown above will return only the unique values for the feature HARDDRIVE that are in the system. At first, the <where_clause> is empty. As features, values and operations are selected, the where clause will contain the selections (or constraints) so far. If the user selected 1000 and clicked on the "greater than or equal to" symbol on the selection bar for hard drive, the next time that the query is run, the system would add HARDDRIVE>1000 to the where clause. The foregoing has the effect of subsetting all of the other feature values as only those which are also found in a product with a hard drive which is 1 GB or larger. On successive queries, the values are ANDed together so that only products which contain all of the selected features will be considered. Alternatively, the features could be ORed together to show the user products which have ANY (i.e., one or more) of the selected features.

In the above example, where the initial values list for MEMORY could have contained 8, 16 and 32, after the HARDDRIVE selection, the system may return only 16 and 32 because there are no available products with 8 MB of memory and a 1 GB hard drive. In this way, feasible products are always kept in the product space and the user will never enter a query selection which yields no products (i.e., no search results). Providing the user with search results is extremely important for keeping a user shopping at your web site, as there is nothing more frustrating than taking the time to formulate a query, only to get back no results.

It is important to note that if the user selects multiple values on a single input entry, these values must be ORed with each other before being ANDed with previous or subsequent constraints. For example, if the user selects 1000 and 2000 for HARDDRIVE, then the query should be "HARDDRIVE=1000 OR HARDDRIVE=2000". If on the next invocation, the user selects "MEMORY=16", then the query should be "HARDDRIVE=1000 OR HARDDRIVE=2000 AND MEMORY=16". In this way, like features from each iteration are ORed together and dissimilar features are ANDed together to produce the desired result. It should be noted that "like" features from successive iterations are not ORed together, but rather ANDed together, which allows further refinement of a previous feature constraint.

In order for the foregoing to work in a web-based CGI environment, the system must maintain its own state, because CGI programs inherently have no notion of state. CGI programs service a transaction and then exit, "forgetting" everything previously done. It is for this reason that the constraint list of feature, operation, and values must be converted into a format which can be appended to the URL and later transformed back into constraints for a <WHERE_CLAUSE> on subsequent invocations. The server program sends its state, including the previous constraints, to the client and the client sends the constraints back in the next <WHERE_CLAUSE>. In this way, previous constraints from previous query string(s) from the HTML query will be incorporated into each successive call.

The invention has been described with reference to several specific embodiments. One having skill in the relevant art will recognize that modifications may be made without departing from the spirit and scope of the invention as set forth in the appended claims.

What is claimed is:

1. A method for providing a user interface interaction for equality and inequality searching of a database comprising a plurality of product records indexed by at least one product feature at a computer having a computer display comprising the steps of:
   dynamically generating a display file comprising at least one product feature, a product feature value variable for each of said at least one product feature, and an image file comprising graphical representations of each of a plurality of search parameters, said graphical representations comprising representations of each of the equality and inequality symbols comprising equal to, not equal to, greater than, less than, greater than or equal to, and less than or equal to for use by a user to select one of said graphical representations for each of said at least one product feature to identify the range of product feature value variables to be searched; and
   displaying the contents of said display file at said computer display as a displayed image.

2. The method of claim 1 further comprising the steps of:
   receiving input from said user to said computer at said displayed image, wherein said input comprises selection of at least one of said plurality of search parameters;
   interpreting said user input by determining where said user input was provided to said displayed image to determine which of said plurality of search parameters were selected; and
   conducting said searching based upon said interpreting.

3. The method of claim 2 wherein said interpreting comprises the steps of:
   calculating the X-axis position of said user input on said displayed image; and
   correlating said X-axis position to one of said plurality of search parameters.

4. The method of claim 2 further comprising the steps of:
   dynamically generating and displaying graphical representations of results of said searching including a successive plurality of search parameters to said user;
   receiving further search parameter constraint input to said displayed results from said user; and
   applying said further search parameter constraints to obtain search results.

5. The method of claim 4 further comprising iteratively refining said search based upon user input by repeating said displaying, receiving and applying, wherein said displaying comprises displaying product feature value variables refined by said search parameter constraint input.

6. The method of claim 4 wherein said dynamically generating and displaying results comprises the steps of obtaining a stored display template for said search results; and invoking a stored class for processing said display template.

7. The method of claim 1 wherein said computer comprises a client computer located at a client location and wherein said searching is conducted at a server location.

8. The method of claim 7 further comprising the steps of:
   receiving input from said user to said client computer at said displayed image, wherein said input comprises selection of at least one of said plurality of search parameters;
   interpreting said user input at said client computer by determining where said user input was provided to said displayed image to determine which of said plurality of search parameters were selected;
   communicating said interpreted user input from said client computer to said server location; and
   conducting said searching at said server based upon said interpreted user input.

9. The method of claim 8 further comprising the steps of:
   dynamically generating a successive display file including search results and an image file comprising graphical representations of a plurality of successive search parameters at said server, said successive graphical representations comprising representations of more than one of equal to, not equal to, greater than, less than, greater than or equal to, and less than or equal to;
   sending said successive display file and image file to said computer; and
   displaying said successive display and image file at said computer.

10. The method of claim 9 further comprising the steps of:
    receiving successive input from said user to said client computer at said displayed successive image file, wherein said input comprises selection of at least one of said plurality of successive search parameters;
    interpreting said successive user input at said client computer by determining where said user input was provided to said displayed image to determine which of said plurality of successive search parameters were selected;

communicating said interpreted successive user input from said client computer to said server location; and conducting successive searching at said server based upon said interpreted successive user input.

11. The method of claim 10 wherein said communicating comprises appending said interpreted successive user input to said interpreted user input.

12. A method for providing electronic catalog searching for product information stored in an on-line computer database, in response to user input at a computer display, comprising the steps of:

indexing said product information by at least one product feature;

generating product constraint information about said product information, said product constraint information comprising at least one product feature value;

storing said product information and said constraint information at said computer database;

selectively retrieving constraint information in response to user input;

dynamically generating a display of said retrieved constraint information comprising product feature value variables and of an image file comprising graphical representations of each of a plurality of search parameters, said graphical representations comprising representations of each of the equality and inequality symbols comprising equal to, not equal to, greater than, less than, greater than or equal to, and less than or equal to for use by a user to select the range of product feature value variables to be searched;

displaying said display of retrieved constraint information and of said image file for user selection;

receiving user selection input to said display of said image file comprising selection of one of said graphical representations for each of said at least one product feature; and selectively retrieving product information based upon said user selection input.

13. The method of claim 7, wherein said receiving of user selection input comprises the steps of:

receiving input from said user to said computer at said displayed image;

interpreting said user input by determining where said user input was provided to said displayed image; and conducting said searching based upon said interpreting.

14. The method of claim 13 wherein said interpreting comprises the steps of:

calculating the X-axis position of said user input on said displayed image; and correlating said X-axis position to one of said plurality of search parameters.

15. The method of claim 13 further comprising the steps of:

said computer assembling a successive query packet by appending said interpreted user input to said user query input; and said computer communicating said successive query packet for searching.

16. The method of claim 7 further comprising generating display information for said product information and said constraint information, and wherein said providing display comprises the steps of:

retrieving said display information when selectively retrieving said product information and said constraint information; and formatting display of said product information and said constraint information by applying said display information.

17. The method of claim 12 further comprising the steps of:

generating display information for said product information and said constraint information;

retrieving said display information when selectively retrieving said product information and said constraint information; and wherein said dynamically generating said display comprises formatting display of said product information and said constraint information by applying said display information.

18. A system for providing electronic catalog searching for product information stored in an on-line computer database, in response to user input at a computer display comprising the steps of:

means for indexing said product information by at least one product feature;

means for generating product constraint information about said product information, said product constraint information comprising at least one product feature value;

means for generating display information for said product and constraint information and for rendering said display information as a plurality of display tags, at least one for each product;

means for storing said product and said constraint information and display tags at said computer database;

means for processing said stored information for dynamically generating an image file comprising graphical representations of each of a plurality of search parameters for display with said product and constraint information, said graphical representations comprising representations of each of the equality and inequality symbols comprising equal to, not equal to, greater than, less than, greater than or equal to, and less than or equal to for use by a user to select one of said graphical representations for each of said at least product feature to identify the range of product feature value variables to be searched;

means for receiving user selection input to said display of said image file comprising selection of one of said graphical representations for each of said at least one product features; and means for searching said database based on said user selection input and for providing search results for display to said user.

19. The system of claim 18 further comprising:

means for selectively retrieving stored information in response to user input; and means for providing retrieved product and constraint information for display at said user display.

20. The system of claim 17 further comprising means for interpreting input to said image file for retrieval of stored product and constraint information.

21. The system of claim 19 wherein said at least one means for processing comprises at least one class means for processing said at least one display tag for dynamic generation of a display of retrieved information at said user display.

* * * * *

UNITED STATES PATENT AND TRADEMARK OFFICE
CERTIFICATE OF CORRECTION

PATENT NO.    : 6,324,536 B1
DATED         : November 27, 2001
INVENTOR(S)   : Rofrano It is certified that error appears in the above-identified patent and that said Letters Patent is hereby corrected as shown below:

Title page,
Please delete title and substitute attached title page.

Drawings,
Please delete figures 3-6 for atttached figures 3-6.

Signed and Sealed this

Nineteenth Day of November, 2002

Attest:

JAMES E. ROGAN
Attesting Officer    Director of the United States Patent and Trademark Office

(12) United States Patent
Rofrano

(10) Patent No.: US 6,324,536 B1
(45) Date of Patent: *Nov. 27, 2001

(54) METHOD AND SYSTEM FOR PROVIDING INTERACTIVE ELECTRONIC CATALOG FOR PRODUCT AND CONSTRAINT INFORMATION OF EQUALITY AND INEQUALITY SEARCH

(75) Inventor: John J. Rofrano, Mahopac, NY (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/977,203

(22) Filed: Nov. 24, 1997

Related U.S. Application Data

(60) Provisional application No. 60/053,345, filed on Jul. 22, 1997.

(51) Int. Cl.[7] .................................................... G06F 17/30
(52) U.S. Cl. ........................... 707/5; 707/3; 707/102; 707/104; 705/26; 705/27; 345/968
(58) Field of Search ........................ 707/1, 2, 3, 4, 707/5, 6, 7, 8, 9, 10, 100–104, 501, 513, 516, 908, 526, 500; 705/10, 22, 27, 28, 26; 345/333–335, 968

(56) References Cited

U.S. PATENT DOCUMENTS

| | | | | |
|---|---|---|---|---|
| 5,410,692 | * | 4/1995 | Torres | 707/3 |
| 5,710,887 | * | 1/1998 | Chelliah et al. | 705/26 |
| 5,715,444 | * | 2/1998 | Danish et al. | 707/4 |
| 5,734,888 | * | 3/1998 | Li et al. | 707/4 |
| 5,740,425 | * | 4/1998 | Povilus | 707/100 |
| 5,751,286 | * | 5/1998 | Barber et al. | 345/348 |
| 5,761,655 | * | 6/1998 | Hoffman | 707/4 |
| 5,819,092 | * | 10/1998 | Ferguson et al. | 395/701 |
| 5,832,496 | * | 11/1998 | Anand et al. | 707/102 |
| 6,076,091 | * | 6/2000 | Fohn et al. | 707/102 |

\* cited by examiner

Primary Examiner—Jack Choules
Assistant Examiner—Srirama Channavajjala
(74) Attorney, Agent, or Firm—Wayne L. Ellenbogen; Anne Vachon Dougherty

(57) ABSTRACT

A system for collecting, categorizing and searching metadata about products which may be the subject of user-input inequality searches. Unique methods are provided for: generating image information at the user interface; inputting of the inequality search; conducting an inequality search based on the metadata in response to input at the user interface; and; displaying the search results appropriately.

21 Claims, 5 Drawing Sheets

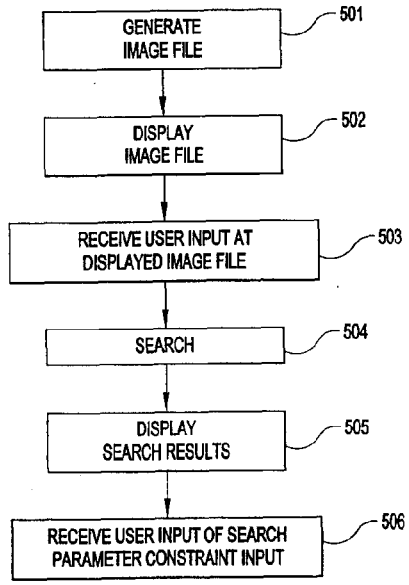

FIG.5